(12) United States Patent
Shaeffer et al.

(10) Patent No.: US 10,247,555 B2
(45) Date of Patent: Apr. 2, 2019

(54) ROUND ROBIN SENSING DEVICE AND METHOD OF USE

(71) Applicant: InvenSense, Inc., San Jose, CA (US)

(72) Inventors: Derek Shaeffer, Redwood City, CA (US); Stanley Wang, Cupertino, CA (US)

(73) Assignee: InvenSense, Inc., San Jose, CA (US)

( * ) Notice: Subject to any disclaimer, the term of this patent is extended or adjusted under 35 U.S.C. 154(b) by 379 days.

(21) Appl. No.: 15/215,759

(22) Filed: Jul. 21, 2016

(65) Prior Publication Data

US 2016/0327393 A1    Nov. 10, 2016

Related U.S. Application Data

(62) Division of application No. 13/958,465, filed on Aug. 2, 2013, now Pat. No. 9,459,274.

(60) Provisional application No. 61/780,371, filed on Mar. 13, 2013.

(51) Int. Cl.
*G01C 19/5776* (2012.01)
*G01P 1/04* (2006.01)

(52) U.S. Cl.
CPC ............ *G01C 19/5776* (2013.01); *G01P 1/04* (2013.01)

(58) Field of Classification Search
CPC ............................... G01C 19/5776; G01P 1/04
See application file for complete search history.

(56) References Cited

U.S. PATENT DOCUMENTS

| | | | |
|---|---|---|---|
| 4,651,565 A | 3/1987 | Keene | |
| 5,983,718 A * | 11/1999 | Wyse | G01C 19/5776 |
| | | | 702/147 |
| 7,663,432 B2 | 2/2010 | Prandi et al. | |
| 2003/0098699 A1 | 5/2003 | Lemkin et al. | |
| 2010/0132463 A1* | 6/2010 | Caminada | G01C 19/5712 |
| | | | 73/504.12 |

(Continued)

FOREIGN PATENT DOCUMENTS

| | | |
|---|---|---|
| CN | 101033984 A | 9/2007 |
| CN | 101520327 A | 9/2009 |

(Continued)

OTHER PUBLICATIONS

EP Extended Search Report dated Jan. 12, 2015 in EP Application No. 14159658.5. 12 pages.

(Continued)

*Primary Examiner* — Xin Y Zhong (57) ABSTRACT

A round-robin sensing device is disclosed. The round-robin sensing device comprises a MEMS device, wherein the MEMS device includes first and second sense electrodes. The round-robin sensing device also comprises a multiplexer coupled to the first and second sense electrodes, at least one sense amplifier coupled to the multiplexer, a demodulator coupled to the at least one sense amplifier, and an integrate and dump circuit coupled to the demodulator. Finally, the round-robin sensing device comprises an analog-to-digital converter (ADC) coupled to the de-multiplexer, wherein the multiplexer, the at least one sense amplifier and the demodulator provide a continuous time sense path during amplification that is resettable and wherein the integrate and dump circuit and the ADC provide a discrete time processing path.

17 Claims, 5 Drawing Sheets

(56) References Cited

U.S. PATENT DOCUMENTS

2012/0125105 A1\* 5/2012 Hirano ............... G01C 19/5726
73/514.32
2015/0276407 A1\* 10/2015 Bhandari ................ G01P 15/18
73/504.12

FOREIGN PATENT DOCUMENTS

| CN | 102812328 A | 12/2012 |
| CN | 101788567 B | 9/2013 |

OTHER PUBLICATIONS

Fang, Deyou, "Low-Noise and Low-Power Interface Circuits Design for Integrated CMOS-MEMS Inertial Sensors," 2006, A Dissertation Presented to the Graduate School of the University of Florida. 138 pages.

Sun, Hongzhi, "Sensing and Control Electronics Design for Capacitive CMOS-MEMS Inertial Sensors," 2011, A Dissertation Presented to the Graduate School of the University of Florida. 164 pages.

\* cited by examiner

ROUND ROBIN SENSING DEVICE AND METHOD OF USE

CROSS-REFERENCE TO RELATED APPLICATION

This application is a divisional application and claims the benefit and priority to a pending U.S. application Ser. No. 13/958,465, filed on Aug. 2, 2013, which is incorporated herein by reference in its entirety. The U.S. application Ser. No. 13/958,465 claims the benefit and priority, under 35 USC 119(e), to U.S. Provisional Patent Application No. 61/780,371, filed on Mar. 13, 2013, entitled "ROUND-ROBIN GYROSCOPE," which is incorporated herein by reference in its entirety.

FIELD OF THE INVENTION

The present invention relates generally to sensors and more particularly to sensing of multi-axis sensors.

BACKGROUND

MEMS sensing devices such as multi-axis gyroscope are utilized in a variety of applications. Normally each sensing axis has its own sensing circuit, meaning three copies of the same sensing circuit might be required for a three-axis sensor. This is particularly true of continuous-time sensing. The duplication of the sensing circuit leads to higher costs and sizes of the devices and there is a desire to reduce them by sharing the sensing circuit. The present invention addresses such a need.

SUMMARY

A round-robin sensing device is disclosed. The round-robin sensing device comprises a MEMS device, wherein the MEMS device includes first and second sense electrodes. The round-robin sensing device also comprises a multiplexer coupled to the first and second sense electrodes, at least one sense amplifier coupled to the multiplexer, a demodulator coupled to the at least one sense amplifier, and an integrate and dump circuit coupled to the demodulator. Finally, the round-robin sensing device comprises an analog-to-digital converter (ADC) coupled to the de-multiplexer, wherein the multiplexer, the at least one sense amplifier and the demodulator provide a continuous time sense path during amplification that is resettable and wherein the integrate and dump circuit and the ADC provide a discrete time processing path when switching between the first and second sense electrodes.

DETAILED DESCRIPTION

The present invention relates generally to sensors and more particularly to round-robin sensing devices. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In the described embodiment, round-robin method refers to the method where each axis of the gyroscope is sensed for a certain period of time. Round-robin multi-axis gyroscope refers to the gyroscope with multi-axis sensing and one sensing circuit, where each of the axes of the gyroscope is read out by the sensing circuit one at a time. By applying a round-robin method to a sensing device such as a three axis gyroscope the number of sense path components can be substantially reduced. In so doing, the overall chip size and cost is substantially reduced. To describe the features of the present invention in more detail refer now to the following description in conjunction with the accompanying figures.

Figure 1A:
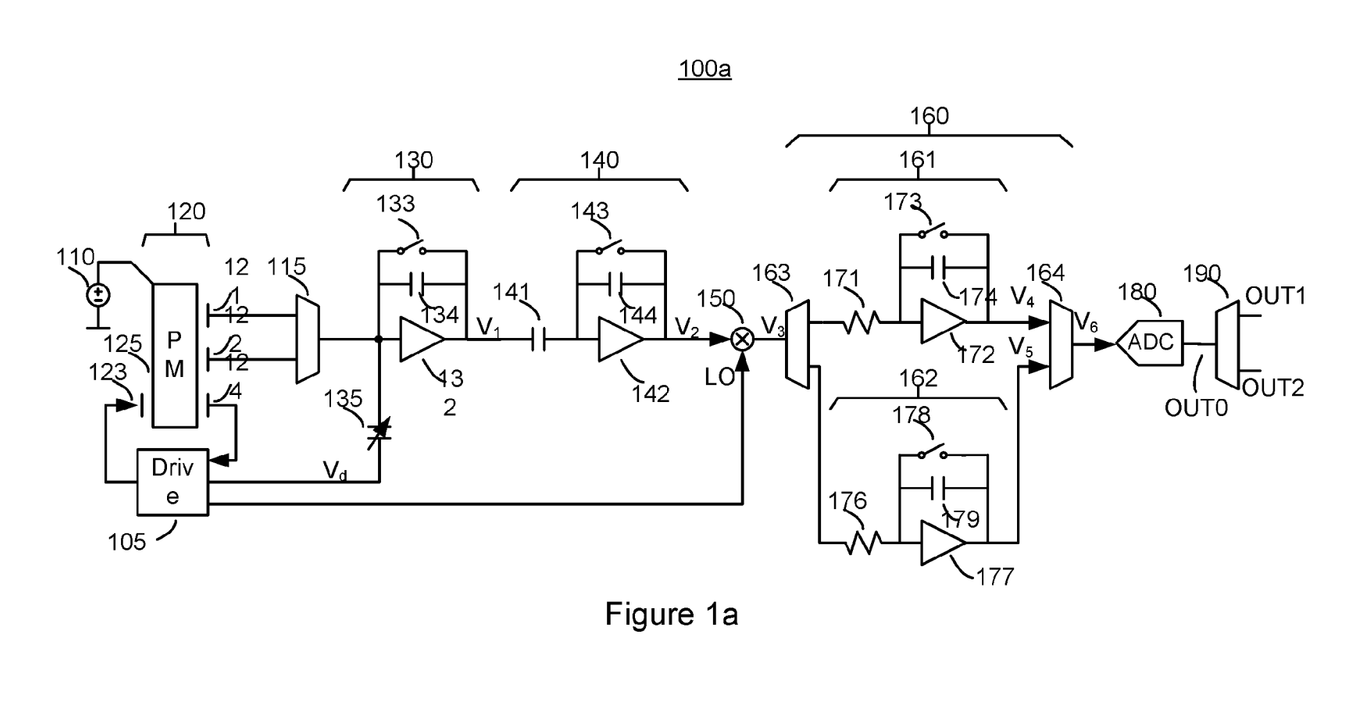
FIG. 1a is a block diagram of a first embodiment of a round-robin multi-axis gyroscope.

FIG. 1a is the block diagram of a first embodiment of round-robin multi-axis gyroscope 100a comprising a sensing device and sensing circuit operating with a continuous-time sensing framework. Although a gyroscope is described herein one of ordinary skill in the art readily recognizes that round-robin sensing device could be a variety of sensing devices. The round-robin multi-axis gyroscope 100a includes a DC voltage source 110, a gyroscope MEMS device 120, a drive system 105, a multiplexer 115, a first sense amplifier 130, a second sense amplifier 140, a mixer 150, an integrate and dump circuit 160, an analog-to-digital converter (ADC) 180, and a de-multiplexer 190. The gyroscope MEMS device 120 includes a proof mass 125, a MEMS sense electrode for the first axis 121, a MEMS sense electrode for the second axis 122, a MEMS drive electrode 123, and a MEMS drive-sense electrode 124.

The first sense amplifier 130 includes an operational amplifier 132, a reset switch 133, a feedback capacitor 134, and a feed-through capacitor 135 for quadrature cancellation. The second sense amplifier 140 includes an input capacitor 141, an operational amplifier 142, a reset switch 143, and a feedback capacitor 144. The integrate and dump circuit 160 includes an input de-multiplexer 163, an output multiplexer 164, two integrators 161 and 162, and each of them includes a resistor 171/176, a reset switch 173/178, a feedback capacitor 174/179, and an operational amplifier 172/177.

MEMS proof mass 125 is biased at a high voltage by DC voltage source 110. The drive system 105 receives input from MEMS drive-sense electrode 124 and drives gyroscope MEMS device 120 to oscillation at drive frequency through drive electrode 123. Drive signal Vd from drive 105 feeds first sense amplifier 130 for quadrature cancellation through feed-through capacitor 135. A clock signal LO is generated and sent to mixer 150 for sense signal demodulation.

Round-robin multi-axis gyroscope 100a has two sensing periods. During the first sensing period, multiplexer 115 is configured to pick up the sense signal for the first axis and quadrature signal from sense electrode 121; during the second sensing period, multiplexer 115 is configured to pick up the sense signal for the second axis and quadrature signal from sense electrode 122. The sense signals are amplitude modulated signals with carrier frequency equal to drive frequency. Quadrature signal is a sinusoidal signal with substantially fixed amplitude running at drive frequency. The phase of quadrature signal is in quadrature relationship with that of the sense signals. Quadrature signal is mostly cancelled by the drive signal Vd through the feed-through capacitor 135, and what remains is called residual quadrature signal. The amplitude of quadrature signal may vary from axis to axis, and feed-through capacitor 135 may be configured differently during each sensing period for maximum quadrature cancellation. The sense signal and residual quadrature signal pass through first and second sense amplifiers 130 and 140 and are demodulated by mixer 150. Clock signal LO runs at drive frequency and is substantially in-phase with the sense signal to maximize the gain of mixer 150 for the sense signal, and residual quadrature is substantially removed given its phase relationship to the sense signal and LO. The output of mixer 150 is processed by integrate and dump circuit 160 and converted to digital signal by ADC 180. The ADC output OUT0 then passes through a de-multiplexer 190. The sense signal for the first axis is de-multiplexed to OUT1 and the second axis is de-multiplexed to OUT2.

Figure 2:
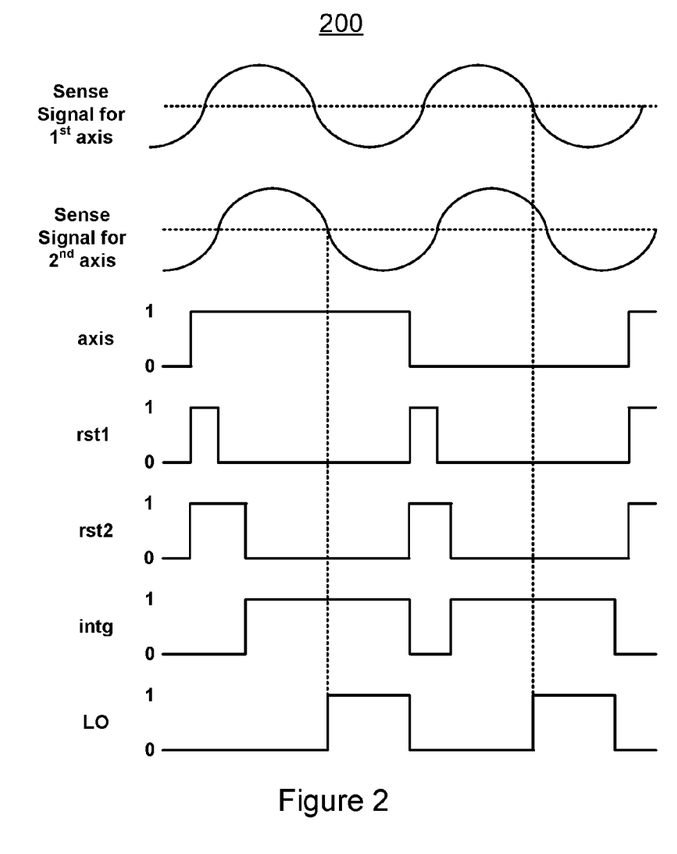
FIG. 2 shows an embodiment of the timing diagram for the control signals of the round-robin gyroscope.

FIG. 2 shows an embodiment of a timing diagram for the control signals of the round-robin multi-axis gyroscope. The operating period for each axis is one period of the sense signal. As drawn, quadrature signal is neglected. When signal axis is set to 0, the first axis is selected and sense electrode 121 is connected to first sense amplifier 130 through multiplexer 115; when signal axis is set to 1, the second axis is selected and sense electrode 122 is connected to the first sense amplifier 130 through multiplexer 115. When signal rst1 is 1, reset switch 133 is enabled to reset first sense amplifier 130. When signal rst2 is 1, reset switch 143 is enabled to reset second sense amplifier 140. Second sense amplifier 140 is kept in reset for some duration after first sense amplifier 130 comes out of reset, and by this way the sampled offset and noise from first sense amplifier 130 when it comes out of reset is absorbed by input capacitor 141 of the second sense amplifier and will not propagate to the output.

When signal axis is set to 0, de-multiplexer 163 is configured to pass input signal V3 to first integrator 161. Reset switch 173 is enabled when signal intg is set to 0 and disabled when signal intg is set to 1, and input signal V3 will be integrated onto feedback capacitor 174. Signal LO transitions from 0 to 1 substantially at the zero crossing of the sense signal for the first axis, and the transition also aligns substantially to the middle of the integration period. By doing so, (a) frequency components near DC which includes the sampled offset and noise from the first and second sense amplifiers 130/140 when the second sense amplifier comes out of reset, (b) frequency components near even harmonics of the drive frequency, and (c) residual quadrature signal, are averaged and nullified by the first integrator 161. Multiplexer 164 is configured to pass output signal V5 from second integrator 162 to the ADC. Reset switch 178 is disabled over the whole period so that second integrator 162 holds the integrated value from the previous period. De-multiplexer 190 is configured to pass ADC output OUT0 to OUT2.

When signal axis is set to 1, de-multiplexer 163 is configured to pass input signal V3 to second integrator 162. Reset switch 178 is enabled when signal intg is set to 0 and disabled when signal intg is set to 1, and input signal V3 will be integrated onto the feedback capacitor 179. Signal LO transitions from 0 to 1 substantially at the zero crossing of the sense signal for the first axis, and the transition also aligns substantially to the middle of the integration period. By doing so, (a) frequency components near DC which includes the sampled offset and noise from the first and second sense amplifiers 130/140 when the second sense amplifier comes out of reset, (b) frequency components near even harmonics of the drive frequency, and (c) residual quadrature signal, are averaged and nullified by second integrator 162. Multiplexer 164 is configured to pass output signal V4 from first integrator 161 to the ADC. Reset switch 173 is disabled over the whole period to hold the integrated value from the previous period. De-multiplexer 190 is configured to pass ADC output OUT0 to OUT1.

The control signals keep repeating and the sense signals from the first and second axes are processed in a round-robin fashion. The integration window dictated by signal intg and signal LO may shift in time from axis to axis for individual phase alignment. Although the integration window for each axis is less than the period of processing the signal for each axis and may shift in time, integrate and dump circuit 161 does hold the value for the whole period after each integration process. This enables the ADC to have a consistent sampling operation going from axis to axis.

Although FIG. 2 indicates that the operating period of each axis is one period of the sense signal, one can extend the idea and instead do half a period of the sense signal, two periods of the sense signal, etc.

Although the embodiments describe 2-axis operation, other embodiments can provide 3-axis operation or more without departing from the scope and spirit as set forth.

Figure 1B:
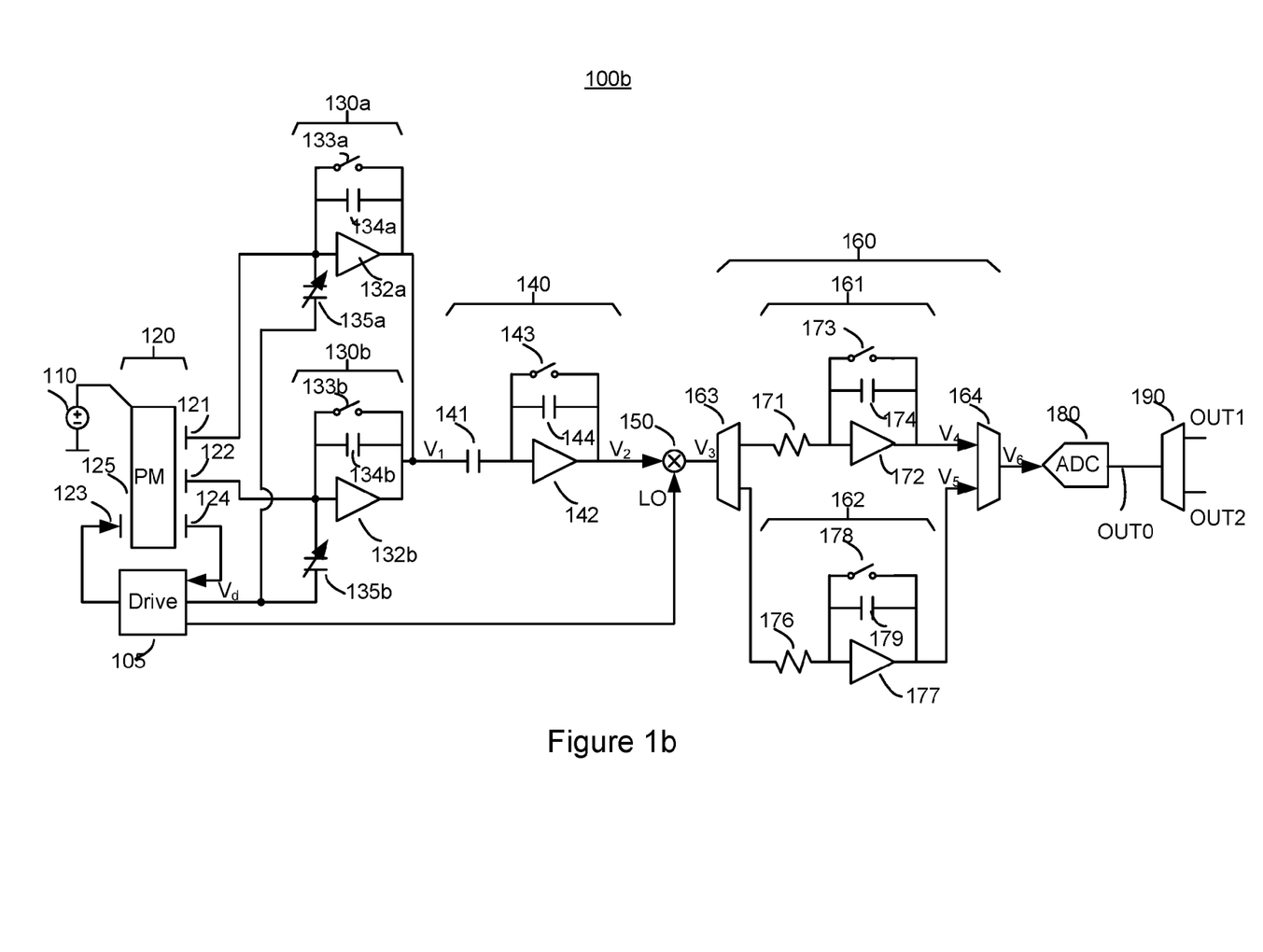
FIG. 1b is a block diagram of a second embodiment of a round-robin multi-axis gyroscope.

Although the embodiments describe MEMS signal multiplexing by using multiplexer 115, signal multiplexing can be achieved in different ways without departing from the scope and spirit as set forth. FIG. 1b shows an embodiment where first sense amplifier 130 is duplicated so that multiplexer 115 is not necessary. Sense amplifier 130a connects to MEMS electrode 121 and sense amplifier 130b connected to electrode 122. The outputs of the sense amplifiers are then multiplexed at V1 by turning only one first sense amplifier on at a time. This embodiment may be advantageous by reducing the number and size of switches at the amplifier inputs.

The second sense amplifier 140 is optional. If it is removed, the sampled offset and noise from the first sense amplifier 130 will still be nullified by the mixer.

Although the embodiments describe the integrate and dump circuit 160 having two separate input resistors 171/176 after de-multiplexer 163, one may instead have one resistor before the de-multiplexer 163 while still maintaining the same functionality.

The round-robin gyroscope can be easily operated as a 1-axis gyroscope when multiplexer 115 is configured to only pick up signal from MEMS electrode 121 or 122 to first amplifier 130 and de-multiplexer 190 is configured to pass signal OUT0 only to OUT1 or OUT2.

Figure 3:
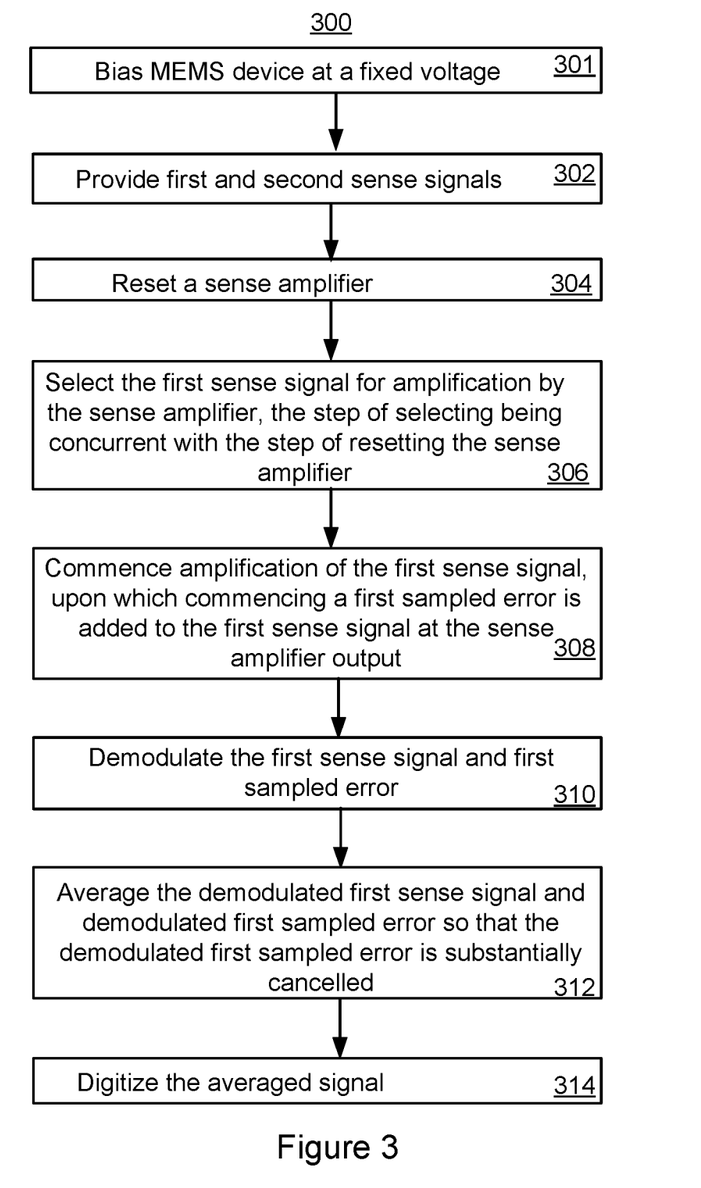
FIG. 3 is a flow chart of a method of operation of the round-robin gyroscope in accordance with an embodiment.

FIG. 3 shows a flow chart of a method of operation of the round-robin gyroscope in accordance with an embodiment. As is seen, a MEMS device is biased at a fixed voltage via step 301. First and second sense signals are provided via step 302. With reference to FIG. 1a, the first sense signal may refer to sense signal from first axis through MEMS electrode 121 and the second sense signal may refer to the sense signal from second axis through MEMS electrode 122. Then a sense amplifier is reset, via step 304. Thereafter, the first sense signal for amplification is selected by first sense amplifier, via step 306. The selecting is concurrent with resetting the sense amplifier.

Thereafter, amplification of the first sense signal is provided, via step 308, upon which commencing a first sampled error is added to the first sense signal at the sense amplifier output. The first sampled error is contributed by the instantaneous first sense signal, quadrature signal, harmonic signals, MEMS noise, and circuit noise. Then the first sense signal and first sampled error are demodulated, via step 310. The demodulated first sense signal and demodulated first sampled error are averaged so that the demodulated first sampled error is substantially cancelled, via step 312. The averaged signal is digitized, via step 314.

Figure 4:
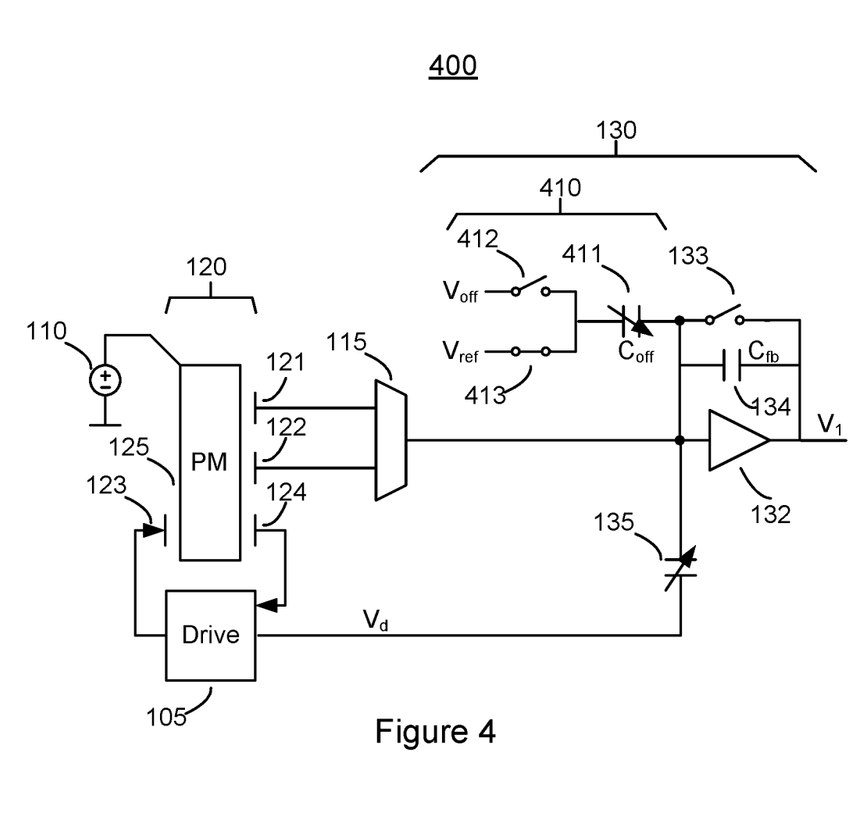
FIG. 4 shows an embodiment of a part of the round-robin gyroscope sense path including a MEMS device, a drive system, and a first sense amplifier with an offset cancellation circuit.

FIG. 4 shows an alternative embodiment of the round-robin gyroscope sense path including the MEMS 120, drive system 105, and the first sense amplifier 130 with an offset cancellation circuit 410. One problem for the first sense amplifier 130 during round-robin operation is that whenever reset switch 133 is opened, an offset can be sampled at the output V1 if the instantaneous input signal to amplifier 130 is not zero. Depending on the timing when reset switch 133 is opened, any of or any combination of sense signal, quadrature signal, and harmonics of the sense/quadrature signals may be sampled.

The sampled offset can potentially cause two issues: (a) if the rate of reset is not aligned properly to the frequencies of the input signals, the sampled offset could change in time and generate a tone that degrades the signal-to-noise ratio; (b) the sampled offset consumes signal headroom and thereby limits the maximum measurable sense signal.

Regarding issue (a), it is handled by making the reset rate synchronous to the input signal, i.e. reset rate is at drive frequency or sub-harmonic of the drive frequency. In so doing the sampled offset is fixed over time.

Regarding issue (b), it is handled by offset cancellation circuit 410. When amplifier 130 is in reset phase (reset switch 133 is closed), the voltage gain of the amplifier is very small and output voltage V1 is close to reference voltage Vref. Switch 412 is turned on at this time and a voltage (Voff–Vref) appears across trim capacitor 411 with total charge of Coff (Voff–Vref). At the moment reset switch 133 is opened, switch 412 is turned off and switch 413 turned on.

Vref driving trim capacitor 411 causes the charge on trim capacitor 411 to transfer to amplifier feedback capacitor 134, leading to a DC voltage offset at output V1 equal to –Coff (Voff–Vref)/Cfb. If the value of Voff and Coff are chosen properly, the DC offset can cancel the sampled offset due to a finite input signal at the moment the amplifier comes out of reset, thereby recovering the loss on signal headroom. Although voltages Voff and Vref are being used in offset cancellation circuit 410 as described above, other implementations are possible, e.g. using Voff1 and Voff2.

Although offset cancellation circuit 410 described above is for single-ended amplifiers, the technique can be easily extended to differential amplifiers by adopting two sets of offset cancellation network: one for the positive, and the other for the negative side of the amplifier. Two bias voltages, e.g. Voff1 and Voff2, can be used to charge trim capacitors to positive and negative voltages. The offset cancellation polarity inversion can be achieved by dumping the charge on the trim capacitor to the opposite side of the amplifier, and Voff1/Voff2 can be of fixed values.

Note that Voff, Voff1 and Voff2 can be either static voltages or periodic voltage signals as long as their values are consistent every time the reset switch is opened. Based on this argument, Voff, Voff1, and Voff2 can be tied to the drive signal Vd or its differential version Vd1 and Vd2 directly given their frequency is the same as the amplifier reset rate, and the moment the reset switch is opened is close to the peak of the drive signal Vd/Vd1/Vd2. By implementing this way, a voltage buffer for providing Voff or voltage buffers for Voff1 and Voff2 can be eliminated.

The described embodiments merge two (for 2-axis operation) or three (for 3-axis operation) sense paths into a single sense path which in turn reduces the circuit area and lowers the power consumption when compared to traditional continuous-time sensing gyroscope architectures.

Compared to a traditional discrete-time gyroscope sensing architecture, this method pertains to the continuous-time circuit scheme and provides (a) a smaller noise bandwidth; (b) compatibility with the use of fixed high-voltage proof-mass biasing to enable larger sense signal; (c) simpler quadrature cancellation scheme as implemented by a feed-through capacitor. For the same power consumption, the described embodiments have better noise performance over discrete-time gyroscope, or for the same noise performance, lower power consumption.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A sensing method comprising:
   biasing a MEMS device at a fixed voltage;
   receiving a first signal and a second signal from the MEMS device, wherein the first signal is associated with a first axis of the MEMS device and wherein the second signal is associated with a second axis of the MEMS device;
   resetting a sense amplifier;
   selecting the first signal or the second signal for amplification by the sense amplifier, wherein the selecting is concurrent with resetting the sense amplifier;
   amplifying the selected signal, wherein a sampled error is added to the selected signal at an output of the sense amplifier to an error signal;
   demodulating the error signal to form a demodulated signal; and
   averaging the demodulated signal to form an averaged signal, wherein the averaging the demodulated signal substantially cancels the error signal.

2. The sensing method of claim 1 further comprising:
   digitizing the averaged signal.

3. The sensing method of claim 2 further comprising:
   demultiplexing the averaged signal to identify a first sensed signal associated with the first axis of the MEMS device.

4. The sensing method of claim 1, wherein the first signal is selected to obtain sensed signal associated with the first axis and wherein the second signal is selected to obtain sensed signal associated with the second axis, and wherein the first signal and the second signal are selected in a round-robin fashion.

5. The sensing method of claim 1 further comprising:
   cancelling a substantial portion of a quadrature portion of the selected signal through a feed-through capacitor coupled to the sense amplifier.

6. The sensing method of claim 1, wherein the MEMS device is a gyroscope.

7. The sensing method of claim 6, wherein the gyroscope comprises multi-axis sensing and one sensing circuit, wherein each signal associated with an axis of the gyroscope is sensed and read out one at a time and in a round-robin fashion.

8. A method comprising:
   biasing a MEMS device at a fixed voltage;
   receiving a first signal and a second signal from the MEMS device, wherein the first signal is associated with a first axis of the MEMS device and wherein the second signal is associated with a second axis of the MEMS device;
   resetting a sense amplifier;
   selecting the first signal concurrent with resetting the sense amplifier;
   removing quadrature components of the first signal to form in-phase component of the first signal;
   outputting the in-phase component of the first signal;
   subsequent to outputting the in-phase component of the first signal, selecting the second signal concurrent with resetting the sense amplifier;
   removing quadrature components of the second signal to form in-phase component of the second signal; and
   outputting the in-phase component of the second signal.

9. The method of claim 8, wherein removing quadrature components of the first signal and the second signal to form the in-phase component of the first signal and the second signal comprises:
   amplifying the first signal and the second signal through another amplifier configured to cancel quadrature component of the first and the second signals.

10. The method of claim 8 further comprising:
    adding a sampled error associated with the first signal to the in-phase component of the first signal to form an error signal;
    demodulating the error signal to form a demodulated signal; and
    averaging the demodulated signal to form an averaged signal, wherein the averaging the demodulated signal substantially cancels the error signal.

11. The method of claim 10 further comprising:
    digitizing the averaged signal.

12. The method of claim 10 further comprising:
    demultiplexing the averaged signal to form the in-phase component of the first signal associated with the first axis of the MEMS device.

13. The method of claim 8 further comprising:
    adding a sampled error associated with the second signal to the in-phase component of the second signal to form an error signal;
    demodulating the error signal to form a demodulated signal; and
    averaging the demodulated signal to form an averaged signal, wherein the averaging the demodulated signal substantially cancels the error signal.

14. The method of claim 13 further comprising:
    digitizing the averaged signal.

15. The method of claim 13 further comprising:
    demultiplexing the averaged signal to form the in-phase component of the second signal associated with the second axis of the MEMS device.

16. The sensing method of claim 8, wherein removing quadrature components of the first signal and the second signal is through a feed-through capacitor coupled to the sense amplifier.

17. The method of claim 8, wherein the first signal and the second signal are selected in a round-robin fashion.

* * * * *